April 14, 1925.  
V. D. HARLAN  
COTTON CLEANING MACHINE  
Filed April 15, 1924  
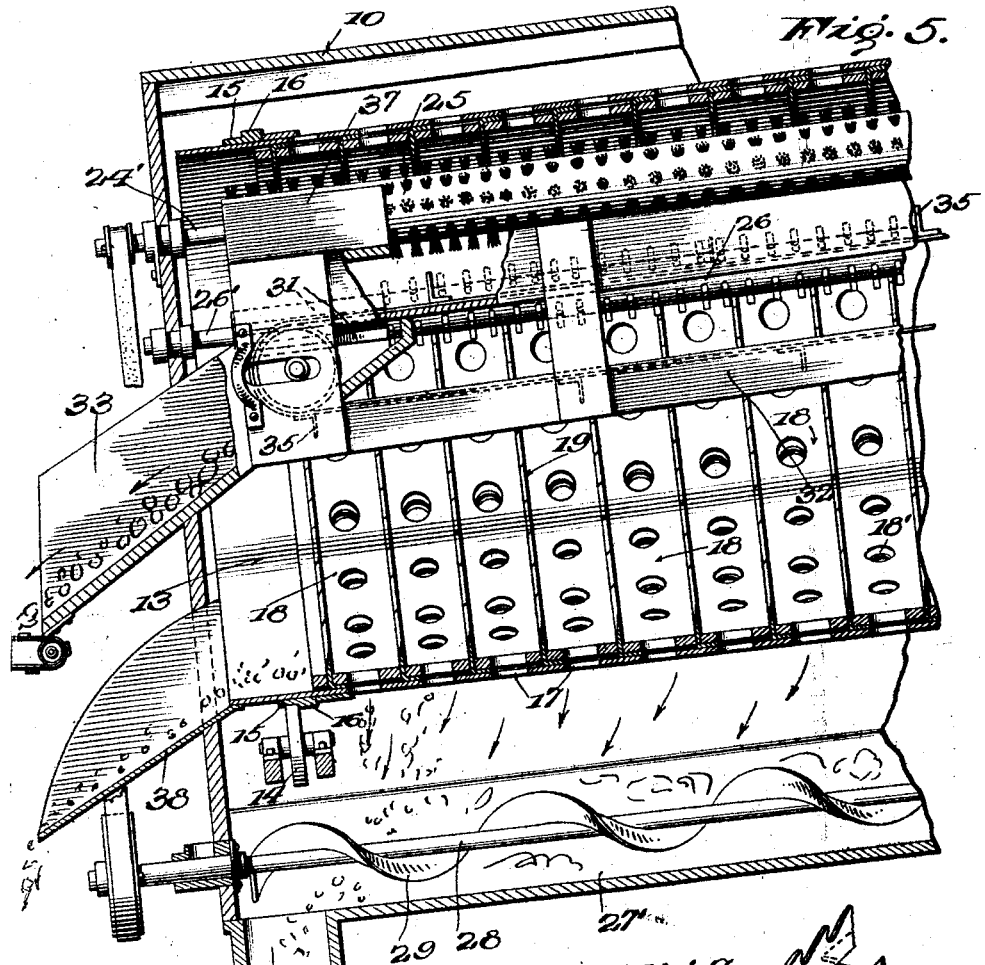
Fig. 5.
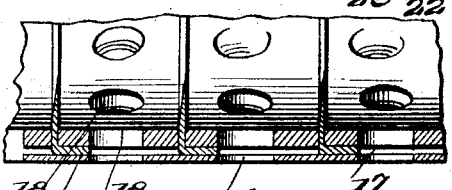
Fig. 6.
Fig. 7.
WITNESSES
INVENTOR  
V. D. Harlan  
BY  
ATTORNEYS Patented Apr. 14, 1925.

1,533,593

UNITED STATES PATENT OFFICE.

VAN DON HARLAN, OF HUMPHREY, ARKANSAS.

COTTON-CLEANING MACHINE.

Application filed April 15, 1924. Serial No. 706,737.

*To all whom it may concern:*

Be it known that I, VAN DON HARLAN, a citizen of the United States, and a resident of Humphrey, in the county of Jefferson and State of Arkansas, have invented certain new and useful Improvements in Cotton-Cleaning Machines, of which the following is a specification.

This invention relates to a cotton cleaning machine.

In all cotton seed received at a cotton oil mill there is a considerable amount of good cotton in the form of cotton locks and linters which have become mixed with the cotton seed, hulls, and other foreign matter present in the seed as delivered to the oil mills. Linters usually accumulate in a seed house at a gin in the form of flakes, chunks, or balls. These linters are of some value but it is necessary that they are separated from the locks of cotton, which are of greater value than linters, for the reason that it is almost impossible to gin the cotton locks when linters are present.

With the heretofore recited in view, it is the object of the present invention to provide a machine whereby "cotton locks" and "cotton linters" may be reclaimed from cotton seed such as delivered to cotton oil mills or as commonly refered to "grabot cotton."

It is an important object of the invention that the cotton locks reclaimed be entirely free from all foreign matter.

It is also an object of the invention that the machine operate in an efficient and expeditious manner.

Other objects, and objects relating to details of construction, combination and arrangement of parts, will hereinafter appear in the following detailed description to follow.

The invention is illustrated by way of example in the accompanying drawings, in which.

Figure 1:
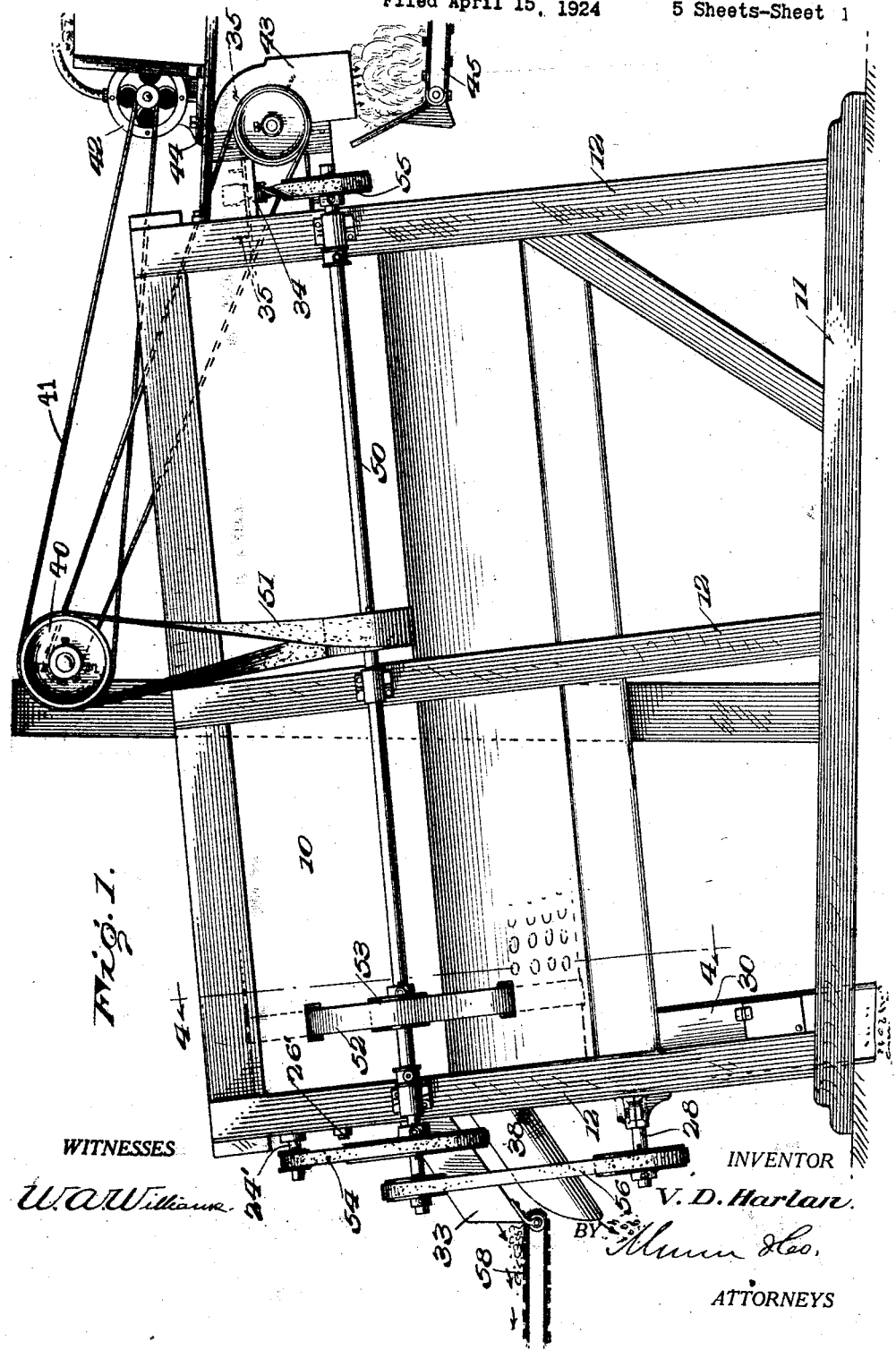
Figure 1 is a view in side elevation of the machine.
Figure 4:
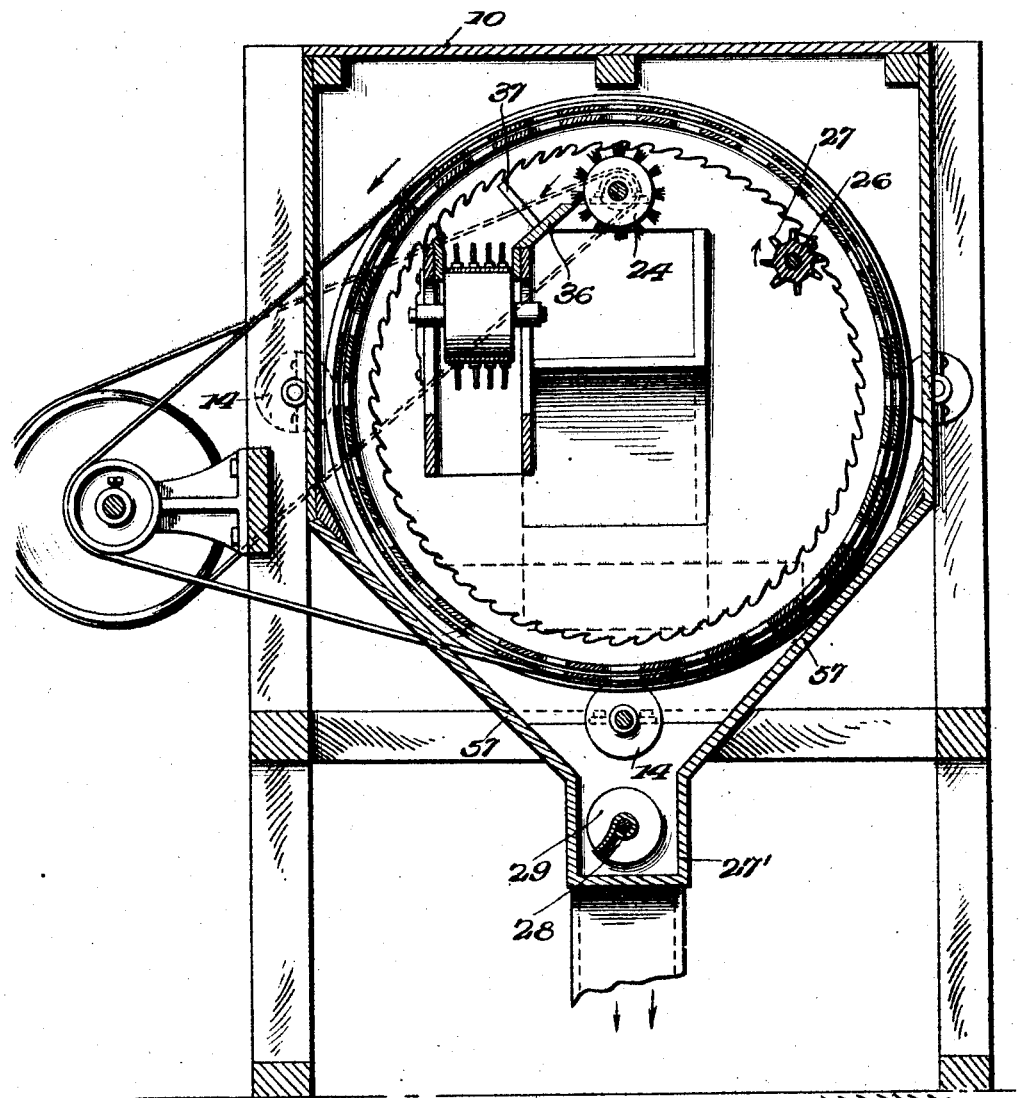

Figure 4 is a transverse sectional view taken substantially on the line 4—4 of Figure 1, Figure 5 is a vertical sectional view of the rear end portion of the machine taken longitudinally thereof, Figure 6 is a fragmentary view illustrating the manner in which the cotton gathering teeth employed are arranged in the sifting drum, and Figure 7 is a detail view further illustrating the construction of the cotton gathering teeth and the rings for holding the same within the sifting drum.

Referring to the drawings more particularly the machine may include a housing generally indicated by the reference character 10. This housing may be supported by a base 11 and supports 12. The housing may be substantially square in cross section and inclined longitudinally as best shown in Figure 1.

Within the housing 10 there is disposed a drum 13, said drum being arranged longitudinally of the housing as shown and revolubly supported by rollers 14. Each roller 14 may be journaled by suitable brackets carried by the housing 10. Suitable bands 15 may be carried by the drum upon which the rollers may engage, and each band provided with a rib 16 to hold the drum against longitudinal movement toward the lower end of the housing 10. The drum is perforated, said perforations being arranged circumferentially of the drum as shown at 17, Figure 5. Within the drum there is positioned a plurality of bands 18, each band being perforated circumferentially as shown at 18′, in Figure 7 and said perforations being so arranged in each instance that the same will register with a row of perforations 17 in the drum 13. Between each adjacent pair of bands 18 there is held a cotton gathering element 19. Each element 19 is in the form of a ring 20 which has its inner periphery formed with teeth 21 extending in a similar direction. Each ring 20 may be in sections to enable easy positioning and removal of same. The outer peripheral edge of each ring 21 is provided with securing tangs 22 and each tang 22 may be provided with a rivet receiving opening 23. The cotton gathering elements or members may be solidly held within the drum by the bands 18, or if desired, these bands may be dispensed with and rivets extended through the drum 13 and openings or holes 23 of the members 19 to rigidly secure the same to the drum.

The drum 13 is open at each end and within the drum adjacent the inner periphery thereof there is positioned a rotatable cylinder 24. This cylinder extends longitudinally of the drum and is rotatably supported by a shaft 24' which is journaled by the end walls of the housing 10. The cylinder 24 carries brushes 25 which are adapted to engage with the teeth 21 of the cotton gathering elements. Also similarly located within the drum is a second cylinder 26 carrying the radial teeth 27, said teeth being arranged in rows circumferentially of the cylinder 26. Each row of teeth is adapted to move between a pair of adjacent cotton gathering members 19. The cylinder 26 is rotatably supported by shaft 26' and this shaft is suitably journaled by the end walls of housing 10, as best shown in Figure 5.

The housing 10 is formed with a trough 27' which extends longitudinally thereof, and within this trough there is disposed a shaft 28 carrying a spiral form of blade 29. The shaft 28 is also rotatably supported by the end walls of the housing 10. The lower end of the trough 27 communicates with a spout 30.

It should be here noted that the cylinder 26 does not extend the entire length of the drum 13, viz., this cylinder extends from the upper end of the drum to a point near the lower end thereof, and the portion of shaft 26' between this last named end of cylinder 26 and lower end of drum carries a plurality of radially extending blades 31. The blades are of such width that they will not engage the teeth 21 of the cotton gathering or collecting members 19.

Within the drum longitudinally thereof is supported a frame generally designated by the reference numeral 32. This frame is supported at its one end by an end wall of the housing 10 and at its other end by a chute 33. Adjacent each end of the frame there is journaled a roller and about these rollers there is trained a conveyor belt 34 which is studded with spikes or teeth 35. The frame 32 carries a board 36 which is inclined as shown in Figure 4. This board extends substantially the entire length of the frame and serves to act as a cotton transfer means between the brushes 25 and the conveyor belt 34. The conveyor frame 32 also carries a deflector board 37 which is equal in length to either of the blades 31 carried by the shaft 26'.

A chute or spout 38 is carried by the lowermost end wall of the housing 10, said chute being disposed in receiving relation to the associated end of the drum 13.

Above the housing 10 there is rotatably supported a shaft 39 which carries a pulley 40 at one end over which passes a belt 41 operatively connected to the electric motor 42.

The forward end of the conveyor frame 32 carries a discharge nozzle 43 which is preferably hinged as at 44. This discharge nozzle is disposed to deposit cotton upon a conveyor 45. The shaft 39 is adapted to drive the conveyor belt 34 through the shaft 46, belt 47 and pulleys 48, and 49.

Upon one side of the housing 10 there is journaled a shaft 50. This shaft is operatively connected to the shaft 39 through the belt 51 and necessary pulleys as shown. A belt 52 passes about the drum 13 and about a pulley 53 carried by the shaft 50.

The shafts 24' and 26' are operatively connected to the shaft 50 through the belts 54 and 55 respectively, and the necessary pulleys as shown. The shaft 50 is also connected to the shaft 28 through the belt 56 and necessary pulleys as shown.

It should be noted that the bottom of the housing 10 comprises two inclined sections 57. These sections terminate at their lower ends with the side walls of the trough 27'.

The spout or chute 33 has its lower end in registering relation to a conveyor indicated at 58. Also it will be noted that the forward end wall of the housing 10 is provided with an opening of relatively large size as shown at 60.

Figure 2:
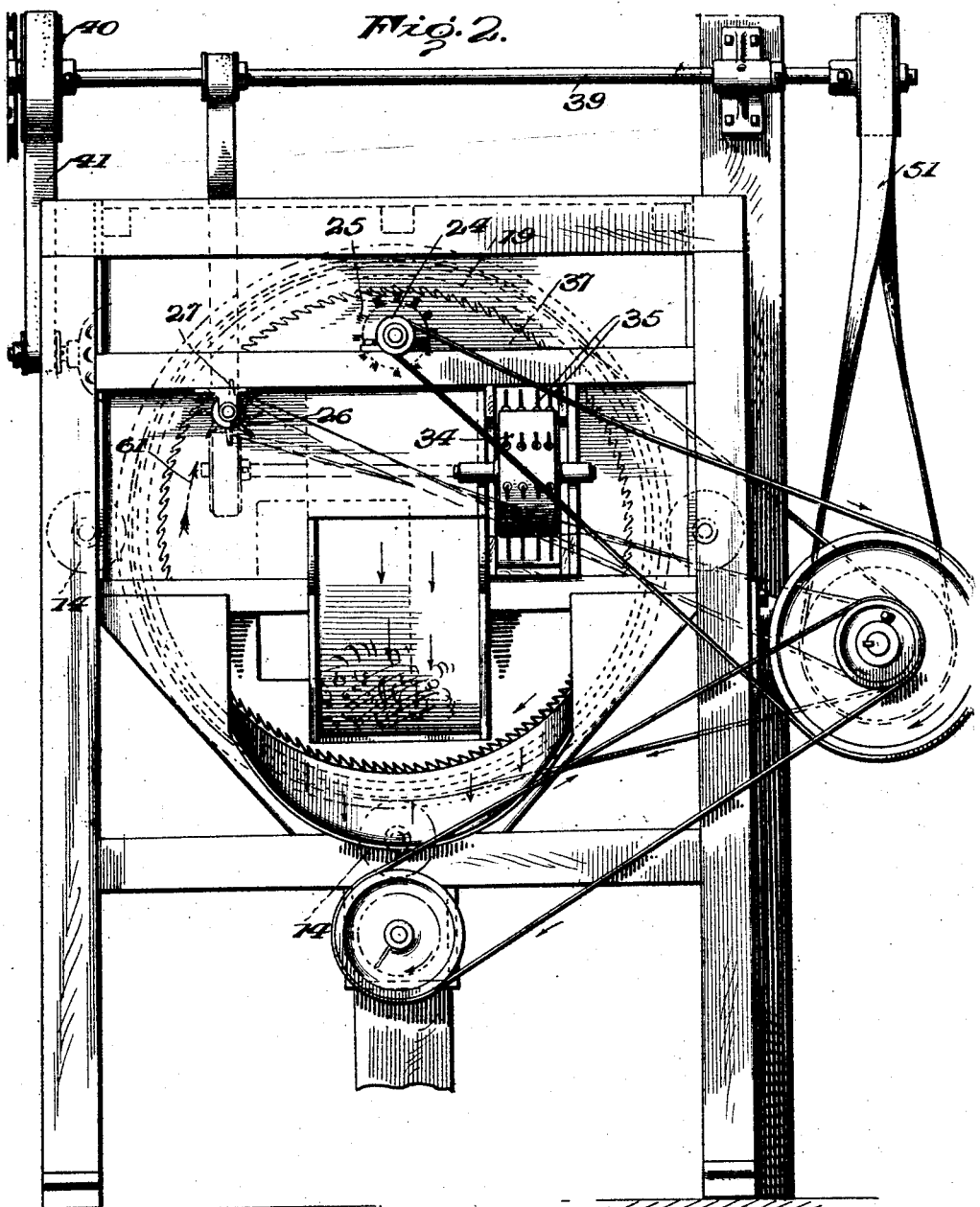
Figure 2 is a rear end elevation of the same.
Figure 3:
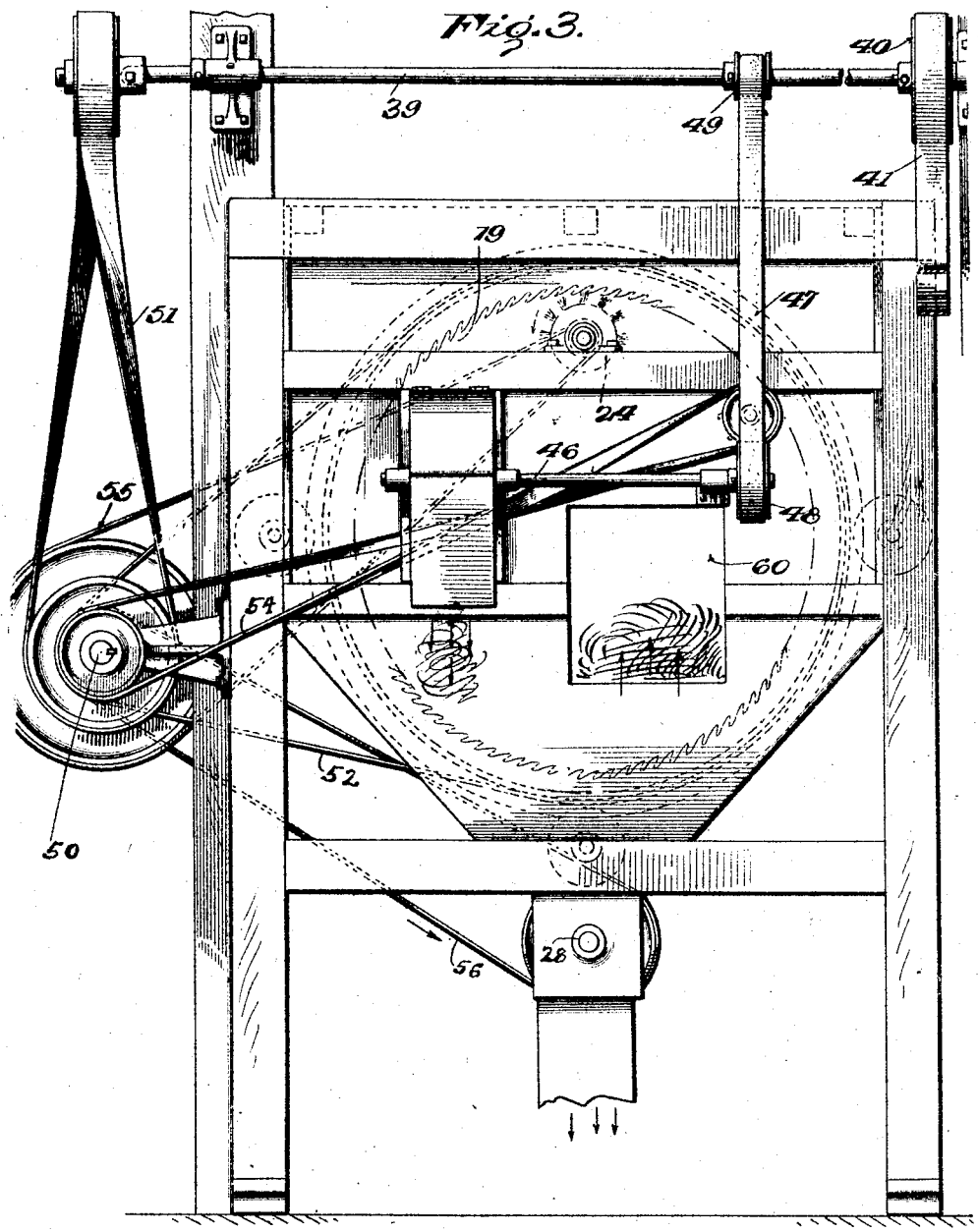
Figure 3 is a front end elevation of the machine.

In utilizing the present machine the "grabot cotton" is thrown through the opening 60 upon the inner peripheral surface of the drum 13. The drum revolves in the direction of arrow 61 Figure 2. The cylinder 24 carrying the brushes 25 revolves in the same direction and the cylinder 26 revolves in the opposite direction to that of the drum 13 and cylinder 24. The conveyor belt 34 moves in a direction to deliver cotton to the discharge nozzle 43.

Rotary movement of the drum 13 carries the uncleaned cotton upward and toward the cylinder 26. The small foreign particles in the cotton drop through the perforations of the drum 13 into the trough 27. These particles are carried downward to the spout 30 by the spiral blade or vane 29 carried by shaft 28.

The teeth 21 of the collecting members 19 gather "locks" of cotton and carry the same toward the brushes 25 of cylinder 24. The teeth 27 of cylinder 26 permit these "locks" of cotton to pass. The brushes 25 collect these "locks" of cotton from the teeth 21 and throw the same upon the board 36. The "locks" of cotton gravitate upon the conveyor belt 34 which delivers the same to the conveyor belt 45 which may in turn deliver this cotton to a suitable receptacle.

As before stated there is present in the "grabot cotton" a considerable amount of "linters" which are in the form of balls of cotton, and are valuable. These "linters" will accumulate between the collector members 19 and upon being brought to the teeth 27 of cylinder 26, the same will be thrown to the bottom of the drum. This operation will continue as these "linters" gravitate toward the lower end of the drum 13. The blades 31 of the shaft 26' will permit the "linters" to pass, and upon said "linters" reaching the brushes 25 the same will be thrown against the board 37 and gravitate into the chute 33, and upon the conveyor belt 58.

The hulls and other large particles in the cotton being cleaned, will gravitate toward the lower end of drum 13 and ultimately be discharged from the spout or chute 38.

While I have shown and described the preferred form of my invention, I wish it to be understood that I am aware of the fact that the general structure, combination and arrangement of parts constituting my invention might be changed by one skilled in the art, without departing from the spirit of my invention as indicated by the appended claims.

I claim:—

1. A cotton cleaning machine of the character described, comprising a rotatable drum adapted to permit uncleaned cotton to be deposited therein, cotton gathering members carried upon the inner peripheral surface of said drum, a conveyor movable through the drum, and means adapted to deposit the cotton gathered upon said conveyor.

2. A cotton cleaning machine of the character described, comprising a rotatable drum adapted to permit uncleaned cotton to be deposited therein, means for rotating the drum, teeth upon the inner periphery of the drum adapted to gather cotton with the rotation of the drum, a conveyor movable through the drum, and means adapted to remove cotton from said teeth and deposit the same upon the conveyor.

3. A cotton cleaning machine of the character described, comprising a rotatable drum adapted to permit uncleaned cotton to be deposited therein, means for rotating the drum, teeth upon the inner periphery of the drum adapted to gather cotton with the rotation of the drum, a conveyor movable through the drum and a rotatable brush adapted to be utilized to remove the cotton gathered by said teeth and deposit the same upon the conveyor.

4. A cotton cleaning machine of the character described, comprising a perforate and inclined drum adapted to permit uncleaned cotton to be deposited therein, means for rotating the drum, teeth upon the inner periphery of the drum adapted to gather cotton with the rotation of the drum, a conveyor movable through the drum, and means adapted to remove cotton from said teeth and deposit the same upon the conveyor.

5. In a cotton cleaning machine of the character described, a rotatable inclined drum adapted to permit uncleaned cotton to be deposited in the upper end thereof, a shaft arranged adjacent the inner periphery of the drum longitudinally of said drum, teeth carried by the shaft movable in close relation to the inner periphery of the drum, said shaft extending the entire length of the drum but the teeth being omitted upon a portion of the shaft adjacent the lower end of the drum, and means for rotating the drum and shaft in opposite directions whereby linters carried upon the inner periphery of the drum will be thrown to the bottom of the drum by the teeth carried by said shaft until said linters gravitate downward through the drum to a point beyond the teeth upon said shaft.

6. In a cotton cleaning machine of the character described, a rotatable inclined drum adapted to permit uncleaned cotton to be deposited in the upper end thereof, a shaft arranged adjacent the inner periphery of the drum longitudinally of said drum, teeth carried by the shaft movable in close relation to the inner periphery of the drum, said shaft extending the entire length of the drum but the teeth being omitted upon a portion of the shaft adjacent the lower end of the drum, and means for rotating the drum and shaft in opposite directions whereby linters carried upon the inner periphery of the drum will be thrown to the bottom of the drum by the teeth carried by said shaft until said linters gravitate downward through the drum to a point beyond the teeth upon said shaft, and means at the lower end of the drum whereby the cotton may be collected.

7. In a device of the character described, a drum having circumferentially arranged rows of perforations, bands fitted within the drum having perforations adapted to register with the rows of perforations in said drum, and cotton collecting rings clamped between the bands.

8. In a device of the character described, a drum, and cotton collecting rings within the drum, each ring having collecting teeth formed upon its inner periphery and laterally extending securing tangs upon its outer periphery.

VAN DON HARLAN.